United States Patent [19]

Dischert et al.

[11] Patent Number: 4,845,546
[45] Date of Patent: Jul. 4, 1989

[54] COMPOSITE PAL VIDEO TRANSLATOR
[75] Inventors: Lee R. Dischert, Burlington, N.J.; Robert J. Topper, Hatboro, Pa.
[73] Assignee: Matsushita Electric Industrial Co., Ltd., Kadoma, Japan
[21] Appl. No.: 225,473
[22] Filed: Jul. 28, 1988
[51] Int. Cl.⁴ .............................................. H04N 9/44
[52] U.S. Cl. ......................................... 358/17; 358/16
[58] Field of Search ....................... 358/16, 17, 13, 11, 358/19

[56] References Cited
U.S. PATENT DOCUMENTS
4,660,074  4/1987  Schine .................................. 358/16

Primary Examiner—James J. Groody
Assistant Examiner—David E. Harvey
Attorney, Agent, or Firm—Amster, Rothstein & Ebenstein

[57] ABSTRACT

Apparatus for translating a standard PAL composite signal into a composite signal in which the color signal is modulated on a subcarrier having an integral number of quarter cycles occurring during a line scanning interval. The standard PAL composite signal is written into a FIFO memory at $4 \times F_{sc}$ samples a second and read from the memory at $1135 \times F_h$ samples a second. Between fields the writing of the PAL composite signal is interrupted for two samples.

1 Claim, 1 Drawing Sheet

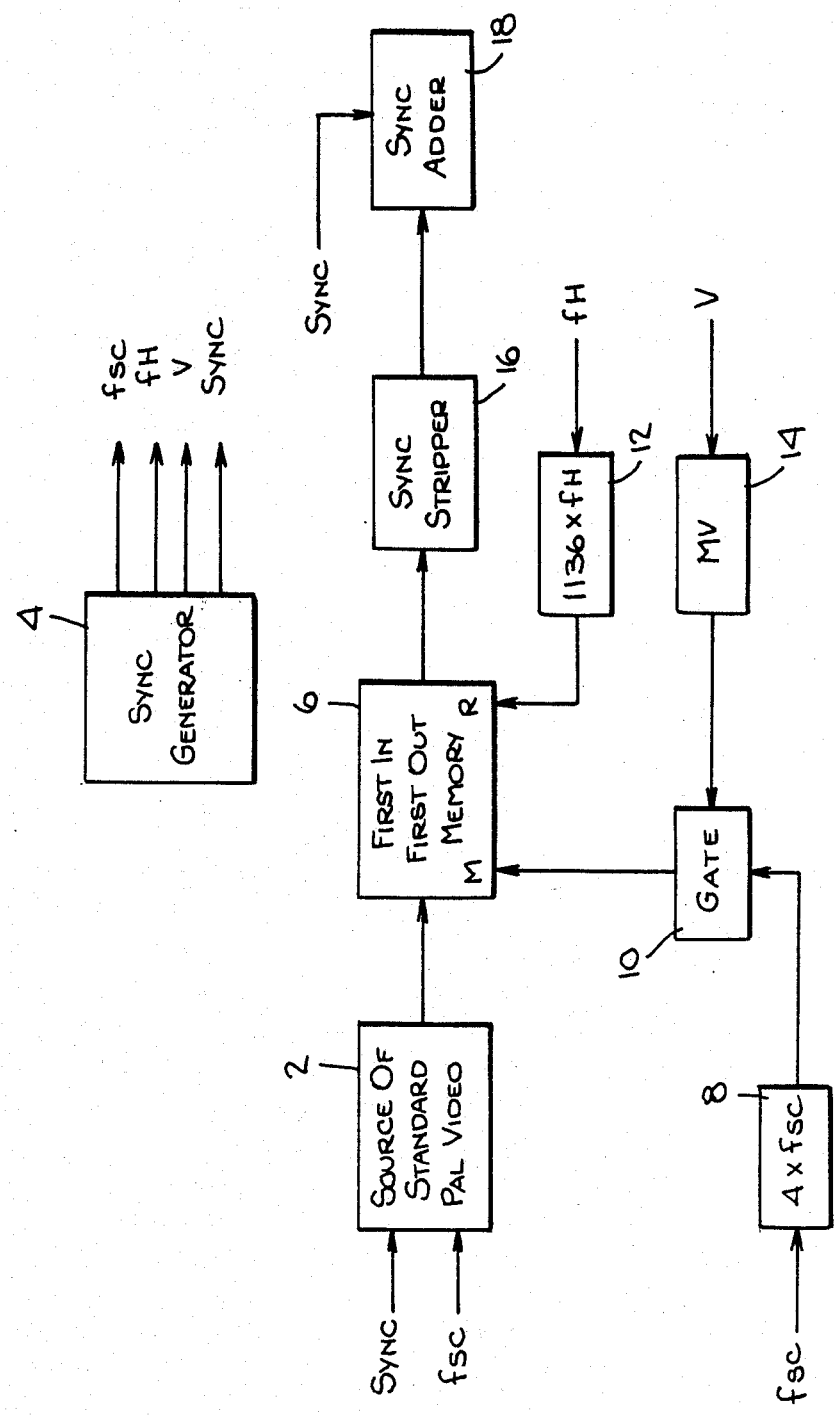

COMPOSITE PAL VIDEO TRANSLATOR

BACKGROUND OF THE INVENTION

In the color television system used in Europe referred to as PAL, standing for phase alternate line, the frequency of the color subcarrier is such that there are an integral number of quarter cycles plus a small fraction of a cycle occurring during each line scanning interval. During a field, the fractions accumulate to a value of two quarter cycles so that the subcarrier has a phase at the start of the next field that is 180° different from the phase it had when it started scanning the field just completed.

This reduces the noticeability of dots formed by the presence of the color subcarrier in an image formed on the screen of a television receiver for the following reason. If there were an integral number of quarter cycles occurring during a line scanning interval, the dots produced at sharp vertical edges in a single field would be visible but not particularly noticeable, but when dots are formed in a succession of fields, they would appear to crawl so slowly in a diagonal direction that the eye would have a strong tendency to follow them. Therefore, instead of using a subcarrier frequency of 1135/4 times the line scanning frequency Fh that would provide an integral number of quarter cycles during a line scanning interval, the frequency of the subcarrier in the PAL system was increased by a 25 cycle per second offset so as to attain a non integral number of quarter cycles along a line. Although the dots are still present, they move more rapidly in a diagonal direction so that the tendency of the eye to follow them is significantly reduced, thereby making them less noticeable.

Whereas this improves the images, it creates significant problems in digital signal generators, processors, time base correctors and other digital equipment and requires single sideband heterodyne circuits or phase locked loops because a lock to the color subcarrier can be made at field intervals only when the accumulated fractions equal an integral number of quarter cycles.

BRIEF SUMMARY OF THE INVENTION

In accordance with this invention the modulations on a standard PAL subcarrier are transferred to a subcarrier having an integral number of quarter cycles occurring during a line scanning interval so that they are easier to use with the equipment noted above. A circuit is provided for translating the standard PAL composite video signal including luminance, the color modulated subcarrier and all synchronizing components including the bursts of subcarrier frequency into a composite signal that is the same except that the color signal is modulated on a color subcarrier having an integral number of quarter cycles occurring during a line scanning interval. This can be accomplished by clocking the PAL composite signal into a FIFO memory at four times the frequency of the PAL color subcarrier so that each quarter cycle is stored in a separate address and clocking the information thus stored out of the memory at a rate such that an integral number of addresses are read during a line scanning interval. After each field has been read, the input clocking is interrupted for two clock counts. Inasmuch as this would change the standard line and field sync pulses, they are stripped prior to or just after the FIFO memory and reinserted at a point following the memory.

BRIEF DESCRIPTION OF THE DRAWING

The drawing is a block diagram of an embodiment of the invention in which a standard PAL composite signal is read into a FIFO memory at a rate equal to four times the color subcarrier frequency and read out at a slower rate.

DETAILED DESCRIPTION OF THE INVENTION

In the drawing a source 2 of a standard PAL composite video signal that is coupled so as to receive line and field (vertical) synchronizing pulses and a wave of subcarrier frequency from a sync generator 4 is connected to a write input of a FIFO memory 6, and a multiplier 8 that multiplies the standard subcarrier Fsc derived from the sync generator 4 by four so as to produce clock pulses having a frequency of 4 times Fsc Hz is coupled to a gate 10 that applies these pulses to a write terminal W of the FIFO memory 6. A multiplier 12 that multiplies the frequency Fh of the standard line sync derived from the sync generator 4 by 1135 produces clock pulses having a frequency of 1135×Fh Hz that are coupled to a read terminal R of the FIFO memory 6. A vertical pulse from the sync generator 4 is applied to a multivibrator 14. When it receives a vertical pulse at the end of each field, it provides an output signal to the gate 10 that opens it for two clock counts, i.e., for one half cycle of Fsc, the subcarrier frequency.

If the line and field synchronizing pulses are included in the standard PAL composite signal they may be distorted by changes occurring in the FIFO 6. Therefore, they are stripped from the other signals by a sync stripper 16 that is in series with the FIFO memory 6 and subsequently reinserted by a sync adder 18 that is coupled to the sync generator 4. The sync stripper 18 could be located between the source 2 and the memory 6. If the line and field synchronizing pulses are not included in the output of the source 2, the sync stripper 16 is not required.

In operation, each quarter cycle of the standard PAL modulated color subcarrier is read into a different address in the FIFO memory 4. The signals at these addresses are read out at a slower rate such that an integral number of them, 1135×4 in this example, will be read out during each line scanning interval. In order to compensate for the extra two quarter cycles that are accumulated during a field in a standard PAL composite signal because of the 25 cycle Hz offset, the write clocking is interrupted for two clock counts by action of the multivibrator 14 and the gate 10.

We claim:

1. A circuit for translating a PAL composite signal to a composite signal having a subcarrier with an integral number of quarter cycles occurring during the line scanning interval comprising:

a first-in first-out memory having a signal input, clock write, signal output and clock read terminals, a source of a PAL composite synchronizing signal including vertical sync pulses, a source of clock pulses having the frequency of four times the frequency of the PAL color subcarrier, a gate for coupling said clock pulses to said clock write terminal, a source of clock pulses having a frequency of 1135 times the line scanning frequency coupled to said clock read terminal, means responsive to said vertical sync pulses for opening said gate for two clock counts at the end of a field, a sync generator, and means for inserting sync pulses derived from said sync generator into the signal at the output terminal of said memory.

* * * * *